United States Patent [19]

Pfeil

[11] Patent Number: 5,132,080
[45] Date of Patent: Jul. 21, 1992

[54] PRODUCTION OF ARTICLES FROM POWDERED METALS

[75] Inventor: Leonard B. Pfeil, Edgbaston, England

[73] Assignee: Inco Limited, Toronto, Canada

[21] Appl. No.: 565,523

[22] Filed: Nov. 28, 1944

[51] Int. Cl.$^5$ ............................................ B22F 30/22
[52] U.S. Cl. ......................................... 419/2; 419/3; 419/7; 419/40; 419/36
[58] Field of Search .................. 75/22; 419/2, 3, 6, 419/7, 36, 40

[56] References Cited

U.S. PATENT DOCUMENTS 2,122,053 6/1938 Burkhardt .
2,341,732 2/1944 Marvin .................................... 419/3

Primary Examiner—Brooks H. Hunt
Attorney, Agent, or Firm—Francis J. Mulligan, Jr.; Edward A. Steen

[57] ABSTRACT

A process for producing porous articles from metal powders. A slurry including metal powders is deposited on a horizontally moving surface. The slurry/moving surface combination is passed through an evaporating zone, a calender zone and a sintering zone to form the desired article. The article is then separated from the moving surface.

13 Claims, 3 Drawing Sheets

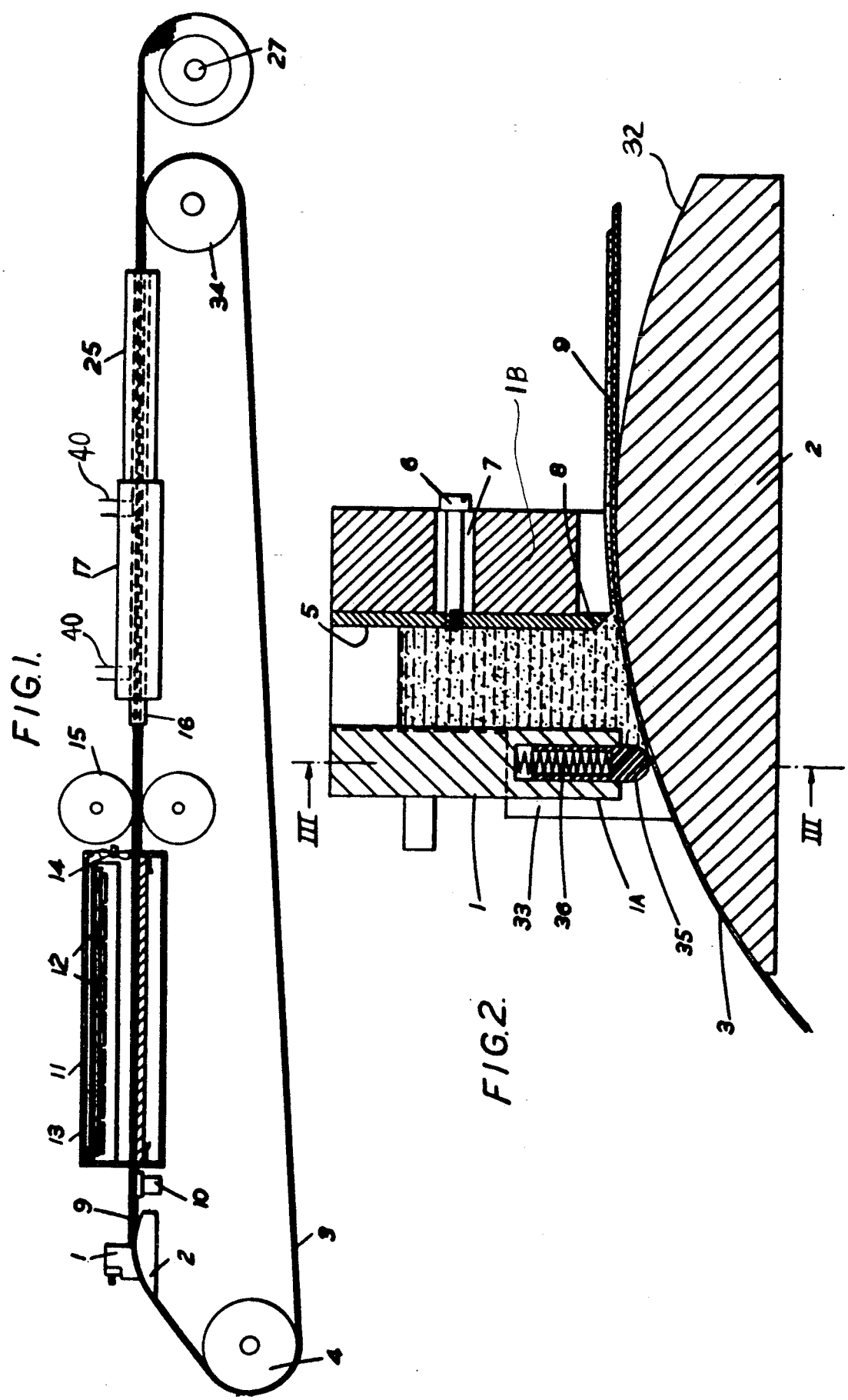

PRODUCTION OF ARTICLES FROM POWDERED METALS

The present invention relates to the production of articles by sintering metal powders, and, more particularly, to a method for producing a continuous sheet or strip having any desired degree of porosity.

In general the metal powders used in powder metallurgy are of a freely flowing nature, and are either charged into moulds, each successive charge in a given mould being of uniform weight, or are applied over a moving surface and spread themselves over it by their capacity for flowing freely. The powders used generally have to be of controlled particle size. There are, however, many powders which will not flow sufficiently freely in the dry state to form a truly uniform layer on a support and so they form products of irregular thickness. In particular it is practically impossible to make powders of very small particle size into uniform layers. Moreover, so far as I am aware, it is both troublesome and expensive by any of the methods now in use so to control the porosity of a sintered product as to produce very fine (microscopic) pores occupying a predetermined proportion of the product and rendering it suitable for use as a permeable membrane.

I have discovered that the prior art difficulties can be overcome by suspending metal powders in a suitable liquid medium to form a slurry, spreading this slurry as a uniform layer over a support and thereafter removing the liquid medium.

My primary object is to produce a metal article in strip or sheet form of very accurate thickness or gauge and to do this rapidly by a continuous process.

It is another object of the present invention to make a porous product the porosity of which can be exactly controlled.

It is a still further object to produce porous articles, such as permeable membranes.

Other objects will become apparent from the following detailed description of the invention, in the course of which reference will be made to the annexed drawings, which are diagrammatic and in which:

FIG. 1 shows the lay-out of one apparatus which may be used in carrying out the invention;

FIG. 2 is an enlarged view showing the initial formation of the slurry layer in the apparatus of FIG. 1;

Figure 3:
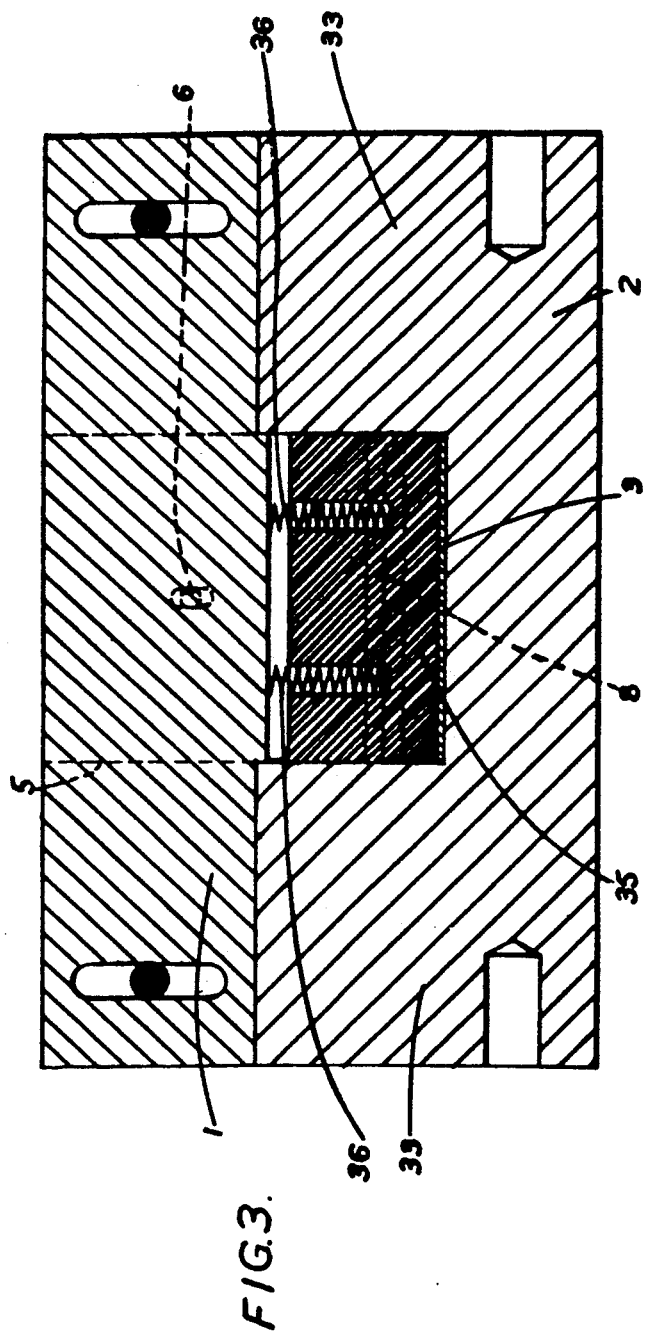
FIG. 3 is a section on the line III—III in FIG. 2.

Broadly stated, the present invention comprises a method of producing a sintered metal product in which metal powder is formed into a slurry with a liquid, the slurry is formed into a uniform layer on a support, the liquid is removed by vaporization to leave a dried layer, and this dried layer is sintered.

The slurry is prepared by mixing metal powder with a liquid until the suspension has a creamy consistency such that it will adhere to a glass rod as a smooth layer. Mixtures of metal powders may be employed and the powder need not be of uniform size; indeed, it may sometimes be advantageous, especially when it is desired to produce porous material, to employ mixtures of different particle size so as to combine the convenient processing characteristics of coarse powder with the fine pore size that is characteristic of the use of fine powder. A particular advantage obtained by the use of a slurry is that the particle size of the powder ceases to be of primary importance and any powder can be distributed more evenly over the support than if it is used dry. Moreover, substances may be added to the slurry to impart solidity to the dried slurry before sintering or to act as spacing materials which will decrease the packing density of the dried slurry and increase the porosity of the sintered products. Particularly suitable substances for this purpose are those which are volatile at the sintering temperature or which can be removed conveniently by means of a solvent. For example, to a slurry of nickel powder, ammonium carbonate may be added and will volatilize during the sintering step, or again aluminium powder may be added, the aluminium being removed from the lightly sintered material by treatment with caustic soda. It will be apparent that the porosity will be increased in proportion to the amount of ammonium carbonate or aluminium powder which is incorporated and which is subsequently removed from the sintered product.

In making the slurry, the proportion of metal powder to liquid must necessarily vary with the size and shape of the metal particles, the packing density of the powder, the rate of travel of the surface on which the slurry is to be formed into a layer, the thickness of that layer and the nature of the liquid. Water may be employed as the liquid medium, but other liquids may be used, for example organic liquids such as alcohols and aromatic hydrocarbons, in particular ethyl alcohol or benzene. In choosing a suitable liquid, attention must be paid to the acidity, which, for example, in the case of water should be kept low, and to the desirability of avoiding coagulation and settling of the solid particles. Wetting and dispersion agents may advantageously be incorporated to assist in maintaining the powder suspended in the liquid.

It is desirable that the dried slurry should be as coherent as possible, and to give it cohesion small amounts of a plastic material, say less than one tenth of the metal powder by weight, may be incorporated in the slurry. Such a material is hereinafter referred to as an "interim binder". The preferred interim binders are any of the thermoplastic resins which will leave practically no residue when volatilized in hydrogen. The thermoplastic resin is preferably incorporated in the slurry in the form of a solution of the resin in a suitable solvent and may, and preferably does, include suitable plasticizers. As an example of such a resin, methyl methacrylate in a benzene solution and including a suitable proportion of di-ethyl-phthalate as a plasticizer has been found to be suitable. When plastic mixtures are used, it is desirable to avoid concentration of the plastic at the surface from which more volatile constituents evaporate. For this purpose, it is preferred to formulate the mixture so that the plastic is precipitated in finely divided form or as a film on the metal particles. This end may be achieved by mixing the metal powder with the plastic dissolved in a minimum quantity of a suitable solvent, such as benzene, and then, just before the spreading operation, introducing a further quantity of a solvent, such as alcohol, with thorough stirring so that much of the plastic is precipitated in finely divided form or as a film on the metal particles.

The surface on which the slurry is spread is preferably a travelling belt, and this may carry the layer through drying and sintering zones. One apparatus embodying such a belt is illustrated diagrammatically in FIGS. 1, 2 and 3 of the accompanying drawings.

In this apparatus, the slurry is introduced into a hopper-like container 1 mounted on a bed plate 2 which acts as a jig. The bed plate 2 is provided with a pair of upstanding spaced-apart side walls 33 forming a trough, the bottom of which is formed by the longitudinally-curved upper surface 32 of the bed plate 2. In operation, an endless belt 3 carried by rollers 4 and 34 passes through the trough over the longitudinally-curved surface 32 and thus forms a moving bottom for the trough. It will be apparent that this trough, together with the rear wall 1-A and the front wall 1-B, forms the hopper-like container 1. This belt 3 may advantageously be made from a chromium-containing alloy such as a nickel-chromium-iron alloy, e.g. the alloy sold under the registered trade mark "Inconel", since an adherent film of oxide can be formed on the surface which prevents unduly firm adhesion of the sintered material to the belt and thus facilitates its removal at the end of the sintering stage. The belt may be very thin, say 0.005 inch thick, so that it will be flexible and will easily adapt itself to the curvature of the surface 32.

The rear wall 1A of the container 1 extends into the trough into contact with the belt so that the slurry cannot escape backwards, and to ensure close contact the bottom edge of the wall may be formed by a rubber pressure pad 35 urged downwards by springs 36. A plate 5 is adjustably fixed to the front wall 1B by means of a screw 6 passing through a slot 7 in the wall and is formed at the bottom with a knife edge 8 which also lies inside the trough. This plate is spaced away from the upper surface of the belt so as to leave a narrow slit through which the slurry is carried away by a belt as a layer 9, and the plate lies above the rising part of the surface 32 in order to ensure that the slurry is spread on the belt 3 while that belt is still bedded down on the surface 32. The arrangement shown results in the thickness of the layer 9 being substantially uniform; this thickness can be varied by adjusting the plate 5 towards or away from the surface 32. It is found that slurry of creamy consistency does not tend to flow provided that the belt is maintained horizontal as it passes onwards, so there is no need to provide any means for preventing the slurry from flowing laterally off the belt after it leaves the bed plate 2. If there is any unevenness in the surface of the slurry layer it may be eliminated at this stage by passing the belt over a vibrator 10 which vibrates at a very high speed in contact with the belt. As a rule this vibration is not required.

The evaporation of the liquid from the slurry may be conveniently effected by passing the moving belt carrying the wet slurry layer through a drying chamber in which the slurry is exposed to radiant heat, or over a hot plate, or in any other suitable way, provided that the vaporization takes place sufficiently slowly and uniformly to avoid disintegration of the spread layer. In the apparatus illustrated, the belt travels through a drier 11 which contains a row of electic heating elements 12 mounted beneath a parabolic reflector 13. At the far end of this drier there is a fan 14 by which the vapors driven out of the wet slurry are removed from the drier. The duration of the drying depends on the speed of the belt and the length of the drier and these must be coordinated with the temperature and the nature of the solvent. For example, the drier may be 30 feet long and the belt may travel at 15 feet a minute, thus taking two minutes to pass through the drier, the temperature being maintained at 50° C. With layers up to 20 mils thick the drying time is in general in the order of one half to five minutes. If desired, the drying may be done at room temperature in which case a period of ten minutes or more is required. The maximum temperature employed during the drying must be such that there is no disintegration of the slurry layer, and in particular the temperature must not reach the boiling point of the volatile constituents. Provided that disruption of the layer is avoided, it is advantageous to dry the layer as quickly as possible, since in this way a higher belt speed can be used or the length of the drier may be reduced.

The dried slurry layer shrinks during the sintering and control of the shrinkage is of great importance in the production of a product of precise predetermined thickness and porosity. When a thin layer of dried slurry is sintered there is always a much more pronounced tendency for shrinkage to occur through the thickness than longitudinally or transversely. It is quite unusual, for example, for a shrinkage of more than ¼" to occur in a width of 2", while the thickness may decrease in a considerably greater ratio. If, however, the dry slurry is stuck to the belt, longitudinal and transverse shrinkage can be prevented and such shrinkage as does occur is only in the thickness. For this reason an oxide film on a belt made from a chromium-containing alloy may with advantage be rendered discontinuous, for example by rubbing with emery cloth, since this promotes slight adhesion between the dried powder and the belt and thus prevents irregular shrinkage and cracking during sintering.

By incorporating a small amount of a plastic material in the slurry sufficient cohesion is imparted to the dried slurry layer to give cohesion until sintering sets in or to allow the layer to be rolled before the sintering. In this rolling operation the thickness of the layer is decreased and the amount of further shrinkage on sintering necessary for the desired porosity to be acquired is correspondingly reduced. Various other steps play a part in the control of shrinkage, e.g. mixing different grades of powder in the slurry, varying the viscosity of the slurry, causing some consolidation of the wet slurry by vibration and so on. None of these steps, however, has an importance comparable with adhesion to the belt and pre-sintering rolling in the control of shrinkage.

In the apparatus illustrated, provision is made for lightly rolling the dried slurry, the belt being passed between calendering rollers 15.

Figure 4:
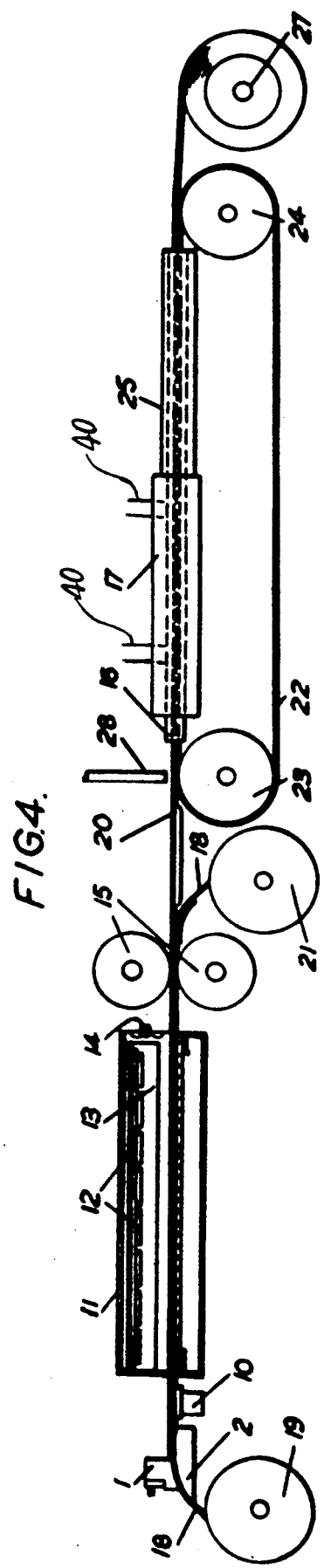
FIG. 4 shows the lay-out of a second form of apparatus.

The belt next passes through a tube 16 contained in an electric furnace 17 and here the powder is sintered. Stated broadly, the sintering is of sufficient duration and at a temperature sufficiently high to cause the particles of metal powder to adhere to each other. The temperature of the sintering furnace is adjusted to suit the nature of the metallic powder under treatment and also the speed of travel of the belt or other moving surface. In general when nickel powder is a major constituent of the dried slurry, the temperature may vary from 650° to 1,100° C. It will be appreciated that the rate of heating, temperatures and so on will depend on the type of powder being treated and on the porosity and mechanical properties desired in the article. It is also important that the sintered material should be rendered strong enough to handle but should not adhere so firmly to the belt as to be difficult to remove from it. The atmosphere in the sintering furnace must be such that the oxygen partial pressure is below the dissociation pressure at the furnace temperature of the oxides of the constituents being sintered. Pure hydrogen and cracked ammonia are suitable for nickel. The said hydrogen or cracked ammonia may be introduced into the tube 16 through gas tubes 40, as shown in FIGS. 1 and 4. No outlet is provided but a certain amount of leakage will occur at the end of the tube 16 and the losses are replaced by continuously introducing fresh gas through the tubes 40. Similar tubes for the same purpose are used in the apparatus shown in FIG. 4. Any plastic materials or volatile spacing materials are removed in the furnace.

The belt may take two minutes to pass through the furnace, the temperature inside the furnace being maintained at 1,000° C. Immediately the belt leaves the furnace it passes through a cooler 25 in which it is cooled substantially to room temperature, and it is then coiled on a holder 27.

It will be appreciated that in order to allow a uniform slurry layer to be formed, the support to which the slurry is applied must be accurately made and present a surface over which the slurry will spread easily. When a metal belt such as that illustrated in FIG. 1 is subjected to high temperatures during the sintering it tends to become distorted, particularly if it is more than, say, 1 inch wide, and thus to become unsuitable for further use. When there is a risk of distortion, I prefer to use two belts, one on which the slurry is spread and dried and another on which the slurry is sintered, the dried slurry being rendered sufficiently coherent to be transferred from the first belt to the second. The first belt need not be made of metal, but may, for example, be made of paper or cloth, provided of course that the material used is one into which the metal powder and liquid do not penetrate unduly.

An apparatus embodying two belts is illustrated diagrammatically in FIG. 4 of the accompanying drawings.

In this apparatus a paper belt 18 is uncoiled from a rotary holder 19 and passes over a bed plate 2 similar to that of FIG. 1. Slurry is applied to the belt in the same way as in FIG. 1 and the slurry layer is similarly dried. The rolling by the rollers 15 is particularly useful, as it facilitates the next step, in which the consolidated slurry layer is stripped from the paper belt, and transferred to the sintering belt. At this stage the dried layer should be sufficiently coherent to permit stripping, handling or rolling without the layer breaking up. The inclusion of a plastic material in the slurry is therefore more important than when only one belt is used.

The gap between the two belts is preferably short, say six inches, and a fixed plate or series of rollers of small diameter may be provided over which the spread and dried layer stripped from the first belt may pass on to the second belt. In the apparatus illustrated the stripping is effected by means of a fixed plate 20, the dried slurry layer passing over the upper surface of the plate and the paper belt passing below the plate and being wound up on a holder 21. The next step is to pick the dried slurry layer up on a second belt 22. This has to pass through the sintering zone so it must be made of heat-resistant material, but on the other hand it need not have the smoothness of surface required by a belt on which the wet slurry is spread. This belt 22 passes round rollers 23 and 24, the roller 23 lying close to the edge of the plate 20. The layer should adhere to the belt 22 if a pronounced tendency to shrink longitudinally is to be overcome during the sintering operation, and to press the layer firmly into contact with the belt a jet of compressed air, which may be heated, is delivered downwards through a fish-tail nozzle 28. Alternatively, a light roller may be employed at this point to press the layer into contact with the second belt. An adhesive consisting, for example, of a thin film of the slurry mixture, may be applied to the belt instead of or in addition to the application of mechanical pressure.

The belt 22 must, of course, run at the same speed as the belt 18, and it passes through a sintering furnace 17 in the same way as the belt 3 shown in FIG. 1.

The further treatment (if any) of the sintered products depends upon the properties required and usually involves mechanical consolidation. It will be apparent that this mechanical consolidation step will generally serve to reduce the porosity in the final product and is, therefore, generally used for that purpose. I have found, however, that porous articles, e.g. membranes, can be produced without mechanical consolidation after the sintering operation. Thus, even if the material is not subjected to mechanical consolidation either before or after the sintering, a coherent product with good mechanical properties can be made by the use of a high sintering temperature with a long period of sintering, e.g. by sintering nickel powder at 1,000° C. for 30 minutes.

Figure 5:
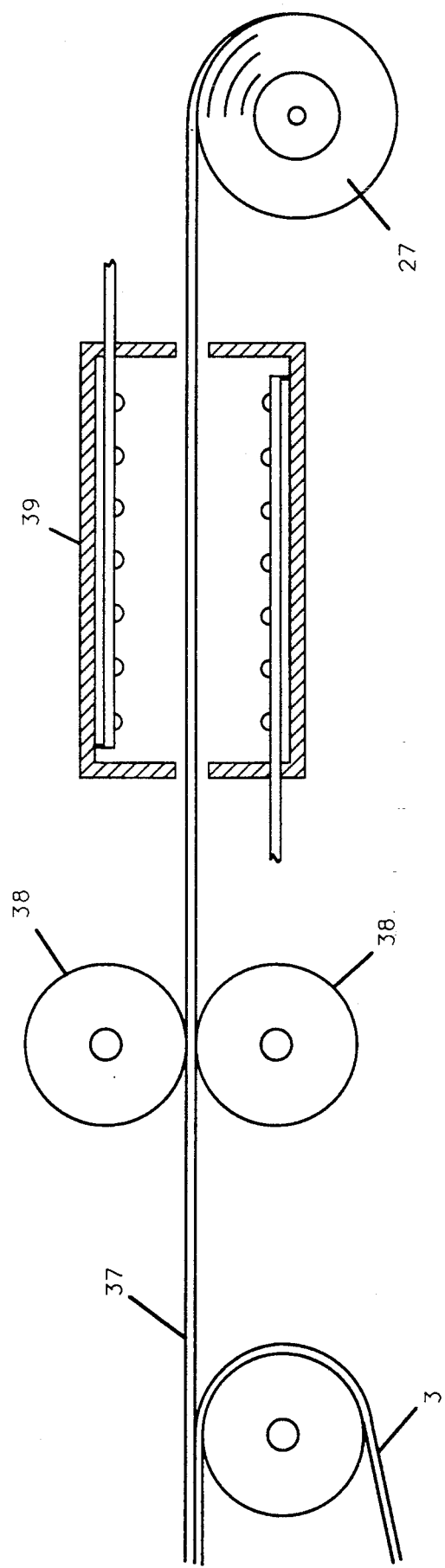
FIG. 5 shows a rolling and annealing apparatus adaptable for use in conjunction with the apparatus shown in FIGS. 1 and 4.

The mechanical consolidation treatment may consist of one or more passes through a rolling mill. In considering this part of the process it must be remembered that when a porous strip, whether sintered or unsintered, is rolled the strip does not become longer as would ordinary metallic strip, but rather it is a matter of squeezing the air out of the strip. However, with increasing reductions by rolling a stage is reached when some appreciable elongation begins to develop, and this occurs before the last of the air is squeezed out of the strip. With a slurry containing a plastic and the use of two belts, considerable reduction in the thickness of the dried slurry should be effected before the sintering, say by reducing a dried layer 8 mils thick to 6, 5 or possibly even 4 mils. It is not permissible, however, when rolling the slurry on a paper belt to cause appreciable elongation. The permissible reduction without elongation is a function of the packing density of the dry slurry. After being sintered such a strip has some residual porosity but is now so highly ductile that further heavy reductions causing elongation are permissible. This subsequent consolidation is preferably effected in a separate mill and it may be done in one stage. Alternatively, it is sometimes advantageous to consolidate the material in a series of stages with or without intermediate heat treatment. The process enables complete control over the porosity to be exercised, in the first place by varying the severity of the mechanical consolidation. The porosity can also be controlled by subjecting the material to one or more additional sintering treatments after consolidation. Thus, if low porosity is required, heavy reductions up to, for example, 80% may be employed or one or more sintering heat treatments may be applied after reduction. Such heat treatments serve not only to reduce the porosity but also to improve the ductility of the article; in general the higher the temperature employed and the longer the time of heat treatment, the lower is the porosity and the higher the ductility of the treated article. If a highly porous material is desired on the other hand, the reduction, if any, and the subsequent heat treatment are sufficient only to impart the necessary mechanical properties to the article. Equipment for use in the aforesaid pressure and annealing steps is illustrated in FIG. 5. The assembly illustrated in FIG. 5 would be interposed, in operation, between reel 34 and holder 27 of the mechanism illustrated in FIG. 1 or between reel 24 and holder 27 of the mechanism illustrated in FIG. 4. Thus, in the apparatus illustrated in FIG. 5, the sintered product 37, after leaving the belt 3, passes between a pair of pressure rolls 38 where it is reduced in thickness and consolidated, thence passing through annealing furnace 39, which will be of such a size that the material will be annealed to the desired extent during the time it passes through said annealing furnace, the sintered annealed product then being rolled on holder 27.

As an example, in the production of a porous strip the dried slurry may be reduced in thickness from 8 mils to 7 mils or 6 mils after the drying or as it passes from one belt to another and there may be no mechanical consolidation after the sintering. It is found that a rolling operation prior to the sintering accelerates the sintering operation. Thus if a strip 8 mils thick when dried would normally sinter down to, say, 6 mils thickness, a pre-sintering reduction from 8 mils to 7 mils may make the thickness of the sintered strip more nearly 5 than 6 mils.

By means of the invention it is possible to produce articles having parts differing in their physical characteristics. This may be done by locally consolidating the sintered product at one or both surfaces or by building up the article in two or more layers. For instance a membrane-like surface may be formed on a more porous backing by first effecting some consolidation in the sintered product by cold rolling and the surface layer may be subsequently further consolidated by localized deformation such as that caused by shot-blasting or the like. A laminated product may be formed by applying the slurry to the surface of a sintered strip produced in a previous operation instead of directly to the surface of a belt. This pre-sintered strip may be rolled if necessary to make its surface smooth, and it may be used in substitution for the first belt in a two-belt process or may itself be supported by a belt. In either case it is uncoiled from a holder and travels through the apparatus with the slurry. On passing through the sintering furnace the dried slurry, in sintering, will become united to the strip beneath it. Alternatively, in a two-belt process a pre-sintered strip may be introduced beneath the dried slurry layer at the point of transfer from the one belt to the other.

Another method of forming a laminated product is to feed slurry onto the dried layer, pass the double layer through a second drier and then sinter the double layer. This method may be used with slurries of different compositions.

As one example of a slurry suitable for use in a two-belt process, a suspension medium may be made by mixing 60 grams of methyl methacrylate with 15 grams diethylphthalate and making this up to 1 liter with a solvent in the form of benzene. The nickel powder is then added, the amount varying with the particle size of the powder. When this is 4.5μ the ratio of nickel powder to liquid may be about 2.5 to 1, e.g. 2,400 grams of nickel are added to 1,000 cc. of suspension medium.

When a slurry of this kind is treated in an apparatus of the kind illustrated in FIG. 1 or FIG. 4, dense non-porous strip may be formed by reducing the thickness of the dried layer by from 60 to 70% at the rollers 15, sintering for two minutes at 1,000° C., rolling the sintered strip to reduce it in thickness by from 25 to 30% and again sintering it for two minutes at 1,000° C. To produce porous strip from the same slurry, the rolling after the drying may be omitted and after the sintering the porosity is from 40 to 60%. The strip is, however, fragile, and to make it capable of being handled and at the same time to reduce its porosity it is rolled to about 50% reduction in thickness, the resulting porosity being 10 to 20%.

If only a single belt is used, a smaller quantity of plastic may be incorporated in the slurry or the plastic omitted altogether. For example, the slurry may have the following composition:

| | |
|---|---|
| nickel powder | 1,000 grams |
| ethyl alcohol | 300 ccs. |
| benzene | 50 ccs. |
| methyl methacrylate | 5 grams |
| di-ethyl-phthalate | 3 ccs. |

Again the slurry may be made by mixing 2,000 grams of nickel powder (4.5μ) with 1,000 cc. of commercial methylated spirits.

It will be noted in the foregoing examples that the solvent for the thermoplastic resin also serves as the liquid medium for the slurry. It will also be noted that this solvent is one which is highly volatile and which will be completely removed during the passage through the drier, thus leaving the thermoplastic resin methyl methacrylate deposited on the nickel particles. This deposit of methyl methacrylate will volatilize in the sintering step in hydrogen to which the layer is thereafter subjected and will thus have served its purpose an an interim binder.

Although the invention is particularly applicable to nickel powder, which is generally employed in particle sizes of from 1 to 10 microns, many other metal powders may be used and their particle size may be from 1 to 50 microns. Examples of other metals are iron, copper and the precious metals (including gold and silver) and mixed powders, e.g. nickel-iron and nickel-copper. Metals which by themselves are not particularly suitable, either having too high a melting point (as in the case if molybdenum and tungsten) or being too easily oxidizable (as in the case of chromium, titanium and zirconium), may be mixed with other metals. Moreover, non-metallic elements, e.g. graphite, may be included in the slurry.

I claim:

1. A substantially horizontal process for the production of a continuous porous metal strip which comprises forming a creamy slurry in a liquid medium of the metal in a powdered state, depositing said slurry via leveling means on a flat substantially horizontal moving surface in a slurry layer of uniform thickness, immediately thereafter horizontally passing said slurry layer through an evaporating zone, a calender zone, and then through a sintering zone whereby the liquid medium is substantially removed and cohesion between the metal particles is subsequently obtained, and thereafter continuously separating the cohesive porous strip thus formed from the moving surface.

2. A substantially horizontal process for the production of a continuous porous metal strip which comprises forming a creamy slurry of the metal in a powdered state in a liquid medium which on subsequent evaporation will leave no residue, depositing said slurry on a flat substantially horizontal moving endless belt in a layer of uniform thickness via leveling means, immediately thereafter horizontally passing said layer through succeeding zones of successively higher temperatures and at least one calender zone, the temperature in the first of said zones being slightly above the volatilization temperature of said liquid medium whereby the liquid medium is substantially removed by volatilization and the temperature in the last of said zones being at least sufficiently high to effect sintering and adhesion between the metal particles, and continuously stripping the cohesive porous strip thus formed from said belt.

3. A process for the production of a continuous porous metal strip which comprises forming a slurry of a mixture of metal particles in a liquid medium which will leave no residue on subsequent evaporation, depositing said slurry on a flat substantially horizontal surface during progressive endwise movement of said surface, evaporating said liquid medium during said endwise progress, consolidating the said layer during continued progress, stripping said dried consolidated layer from said surface and transferring said layer during continued endwise progress of said surface to a second endwise progressing surface, pressing said layer into substantial interfacial contact with said second surface, sintering said layer at a temperature sufficiently elevated to produce substantially complete adhesion between said metal particles whereby a cohesive porous strip is formed, and thereafter removing said cohesive porous strip from said second surface.

4. A process for the production of a porous metal sheet which comprises forming a slurry of a mixture of metal particles in a liquid medium comprising a solution of a thermoplastic resin in a volatile organic solvent, which solution will volatilize without residue at the sintering temperatures thereafter encountered in said process, depositing said slurry on a flat substantially horizontal endless belt during progressive endwise movement of said belt, spreading said deposit in a layer of uniform thickness on said belt during said progress, heating said deposit during continued endwise progress of said belt whereby the solvent is removed from said layer by evaporation, consolidating the solventless layer by the application of light pressure thereto during continued endwise progress of said belt, stripping said sheet from said belt during its further progress and feeding said stripped sheet to a second endwise progressing belt by means of said progressive endwise movement of said first belt, pressing said layer into light adhesive engagement with the surface of said second belt, sintering said layer during endwise progress of said second belt at a temperature sufficiently elevated to produce substantially complete adhesion between said metal particles whereby a cohesive porous sheet is formed, and thereafter removing said sheet from said second belt.

5. A process for the production of a continuous porous metal strip which comprises forming a slurry of a mixture of metal particles in a liquid medium which will leave no residue on subsequent evaporation, depositing said slurry on a flat substantially horizontal surface during progressive endwise movement of said surface, evaporating said liquid medium during said endwise progress, consolidating the said layer during continued progress, stripping said dried consolidated layer from said surface and transferring said layer during continued endwise progress of said surface to a second endwise progressing surface, pressing said layer into substantial interfacial contact with said second surface, sintering said layer at a temperature sufficiently elevated to produce substantially complete adhesion between said metal particles whereby a cohesive porous strip is formed, thereafter removing said cohesive porous strip from said second surface, and passing said cohesive porous strip between a pair of rotatable pressure rolls disposed in spaced-apart relationship slightly less than the thickness of said porous strip, whereby porosity in the sheet is reduced and cohesion between the metal particles is increased.

6. A process as in claim 5 in which the strip is subjected to annealing temperatures after passage between said pressure rolls.

7. A process as in claim 5 in which the strip is subjected to annealing temperatures after said rolling and is thereafter passed between a second pair of rotatable pressure rolls in spaced-apart relationship slightly less than the thicknes of the annealed strip, and again subjecting said strip to annealing temperatures whereby porosity in the strip is further reduced and ductility in the strip is increased.

8. A substantially horizontal process for the production of a continuous porous nickel sheet which comprises forming a creamy slurry of nickel powder in a liquid medium containing an interim binder in solution therein, said interim binder being adapted to complete volatilization without residue at the sintering temperatures thereafter encountered, spreading via leveling means said slurry in a layer of uniform thickness on a flat substantially horizontal endless belt during progressive endwise movement of said belt, immediately thereafter horizontally passing said belt through a heated zone wherein said liquid medium is substantially removed by volatilization during said endwise progress, passing said belt through a calender zone, heating said belt and said layer during continued endwise progress of said belt to a temperature of 650° C. to 1,100° C. in a reducing atmosphere whereby volatilization of said interim binder and adhesion between the nickel particles in said layer is effected, cooling said belt and said adhesive layer to substantially room temperature, continuously separating said layer from said belt and subjecting said layer to mechanical consolidation by passage through a rolling mill, whereby a continuous porous nickel sheet is obtained.

9. A substantially horizontal process for the production of a continuous porous nickel sheet which comprises forming a creamy slurry of nickel powder in a liquid medium containing an interim binder in solution therein, said interim binder being adapted to complete volatilization without residue at the sintering temperatures thereafter encountered, spreading said slurry via leveling means in a layer of uniform thickness on a flat substantially horizontal endless belt during progressive horizontal endwise movement of said belt, immediately thereafter horizontally passing said belt through a heated zone wherein said liquid medium is substantially removed by volatilization during said endwise progress, passing said belt through a calender zone, sintering said layer on said belt during continued endwise progress of said belt, cooling said belt and said layer and the continuous porous nickel sheet thus formed from said belt.

10. A process for the production of a continuous porous nickel sheet which comprises forming a slurry consisting of nickel powder suspended in benzene containing methyl methacrylate in an amount less than one-tenth of the weight of said nickel powder, spreading said slurry in a layer of uniform thickness, passing said slurry layer through a drying zone wherein said slurry layer is subjected to sufficient heat to remove the volatile constituents of said slurry and to substantially dry said layer, and thereafter subjecting said dried slurry layer to a temperature of from about 600° C. to about 1100° C. whereby the methyl methacrylate is removed and the adjacent nickel particles are cohesively interengaged to form said porous nickel sheet.

11. A substantially horizontal process for the production of a porous metal sheet which comprises forming a creamy slurry of a mixture of metal particles in a liquid medium comprising a solution of a thermoplastic resin in a volatile organic solvent adapted to volatilize without residue at the sintering temperatures thereafter encountered in said process, depositing said slurry via leveling means on a flat substantially horizontal surface in a layer of uniform width and thickness, heating said layer until the liquid medium is substantially completely evaporated from said layer whereby the said thermoplastic resin remains in cohesive interengagement with said metal particles in said layer, passing said layer through a calender zone, transforming said cohesive layer to a second substantially flat horizontal surface, sintering said layer while on said second surface whereby the thermoplastic resin is removed by volatilization and adjacent metal particles are cohesively interengaged to form said porous metal sheet and continuously stripping said sheet from said second substantially horizontal surface.

12. A substantially horizontal process for the production of a continuous porous metal sheet which comprises forming a creamy slurry of metal powder in a liquid medium containing an interim binder in a solution therein, spreading said slurry via leveling means in a layer of uniform thickness on a flat substantially horizontal endless belt during progressive endwise movement of said belt, immediately thereafter horizontally passing said belt through a heated zone wherein said liquid medium is substantially removed by volatilization during said movement, passing said belt through a calender zone, compacting the said layer by rolling after removal of the liquid medium and prior to sintering, sintering said layer on said belt to volatilize the interim binder without leaving residue and to produce a porous, continuous sheet, and cooling and continuously separating the said porous, continuous sheet from said belt.

13. A substantially horizontal process for the production of a continuous porous metal sheet which comprises forming a creamy slurry of metal powder in a liquid medium containing an interim binder in solution there, spreading said slurry via leveling means in a layer of uniform thickness on a flat substantially horizontal endless belt and adapted for discontinuous adhesion of the layer thereto, immediately thereafter horizontally progressing said belt through a heated zone wherein said liquid medium is substantially removed by volatilization, passing the layer through a calender zone, reducing the thickness of the layer by rolling after removal of the liquid medium and prior to sintering, sintering said layer on said belt to effect removal of the interim binder by volatilization without leaving residue and to produce a porous continuous sheet, and finally cooling and continuously separating the said porous, continuous sheet from said belt.

* * * * *